United States Patent [19]
Matsumoto

[11] Patent Number: 5,594,412
[45] Date of Patent: Jan. 14, 1997

[54] WARNING SYSTEM FOR VEHICLES

[75] Inventor: Yoshiyuki Matsumoto, Wako, Japan

[73] Assignee: Honda Giken Kogyo Kabushiki Kaisha, Tokyo, Japan

[21] Appl. No.: 340,245

[22] Filed: Nov. 16, 1994

[30] Foreign Application Priority Data

Nov. 17, 1993 [JP] Japan .................................. 5-311341

[51] Int. Cl.⁶ ...................................................... B60Q 1/00
[52] U.S. Cl. .......................... 340/435; 340/436; 340/903; 340/904; 342/70; 367/909; 180/169; 364/460; 364/461
[58] Field of Search .................................... 340/435, 436, 340/901, 903, 904; 342/70, 71; 367/909, 112, 96, 97, 107; 180/169, 168, 167, 170; 364/460, 461

[56] References Cited

U.S. PATENT DOCUMENTS 5,432,509  7/1995  Kajiwara .................................. 367/909

FOREIGN PATENT DOCUMENTS 4213800   8/1992   Japan .
4290200  10/1992   Japan .

*Primary Examiner*—Jeffery Hofsass
*Assistant Examiner*—Nina Tong
*Attorney, Agent, or Firm*—Lyon & Lyon

[57] ABSTRACT

A warning system for a vehicle has a warning device for issuing a warning when the vehicle approaches an object. A warning timing parameter section detects a driving operation by the driver of the vehicle, and calculates a reaction time from the time a warning is issued by the warning device to the time the driver starts the driving operation in response to the warning. A warning control section controls the timing at which the warning should be issued by the warning device, based on the calculated reaction time.

17 Claims, 3 Drawing Sheets

WARNING SYSTEM FOR VEHICLES

BACKGROUND OF THE INVENTION

1. Field of the Invention

This invention relates to a warning system for vehicles, and more particularly to a warning system of this kind, which measures the distance from an object such as a preceding vehicle and issues a warning when the vehicle approaches the object.

2. Prior Art

Conventionally, there have been proposed a warning system for vehicles, which measures or detects the distance between the source vehicle and a preceding vehicle or the like by means of a laser beam while the source vehicle is traveling, and issues a warning to alert the driver when the measured distance becomes smaller than a safety distance determined from the braking distance and free running distance of the vehicle (Japanese Provisional Patent Publication (Kokai) No. 4-213800, and a warning system which exchanges by wireless data on the present location, traveling speed and traveling direction between the source vehicle and neighboring vehicles, and issues a warning when a collision of the source vehicle with a neighboring vehicle at a crossing (Japanese Provisional Patent Publication (Kokai) No. 4-290200).

However, the conventional warning systems do not contemplate the fact that the driver's reaction time, i.e. the time period from the time a warning is issued to the time the driver actually operates the brake or the like varies depending upon the driver. As a result, the driver cannot always operate the brake or the like at appropriate timing in response to a warning issued, such that the timing of issue of a warning is too early to one driver, while it is too late to another driver.

SUMMARY OF THE INVENTION

It is the object of the invention to provide a warning system for vehicles, which is capable of issuing a warning at appropriate timing to the driver, irrespective of the driver's peculiar reaction time.

To attain the above object, the present invention provides a warning system for a vehicle, which comprises:

warning issuing means for issuing a warning when the vehicle approaches an object;

driving operation-detecting means for detecting a driving operation by a driver of the vehicle;

reaction time-calculating means for calculating a value of a reaction time from the time a warning is issued by said warning issuing means to the time it is detected by the driving operation-detecting means that the driver starts the driving operation in response to the warning; and warning control means for controlling timing at which the warning should be issued by the warning issuing means, based on the calculated value of the reaction time.

Preferably, the driving operation-detecting means detects a braking operation by the driver.

Also preferably, the driving operation-detecting means detects a steering operation by the driver, alternatively of or together with detection of the braking operation.

Preferably, the warning control means calculates an average value of values of the reaction time calculated by the reaction time-calculating means, and determines the timing at which the warning should be issued by the warning issuing means, based on the calculated average value.

The above and other objects, features, and advantages of the invention will become more apparent from the following detailed description taken in conjunction with the accompanying drawings.

DETAILED DESCRIPTION

The invention will be described in detail with reference to the drawings showing an embodiment thereof.

Figure 1:
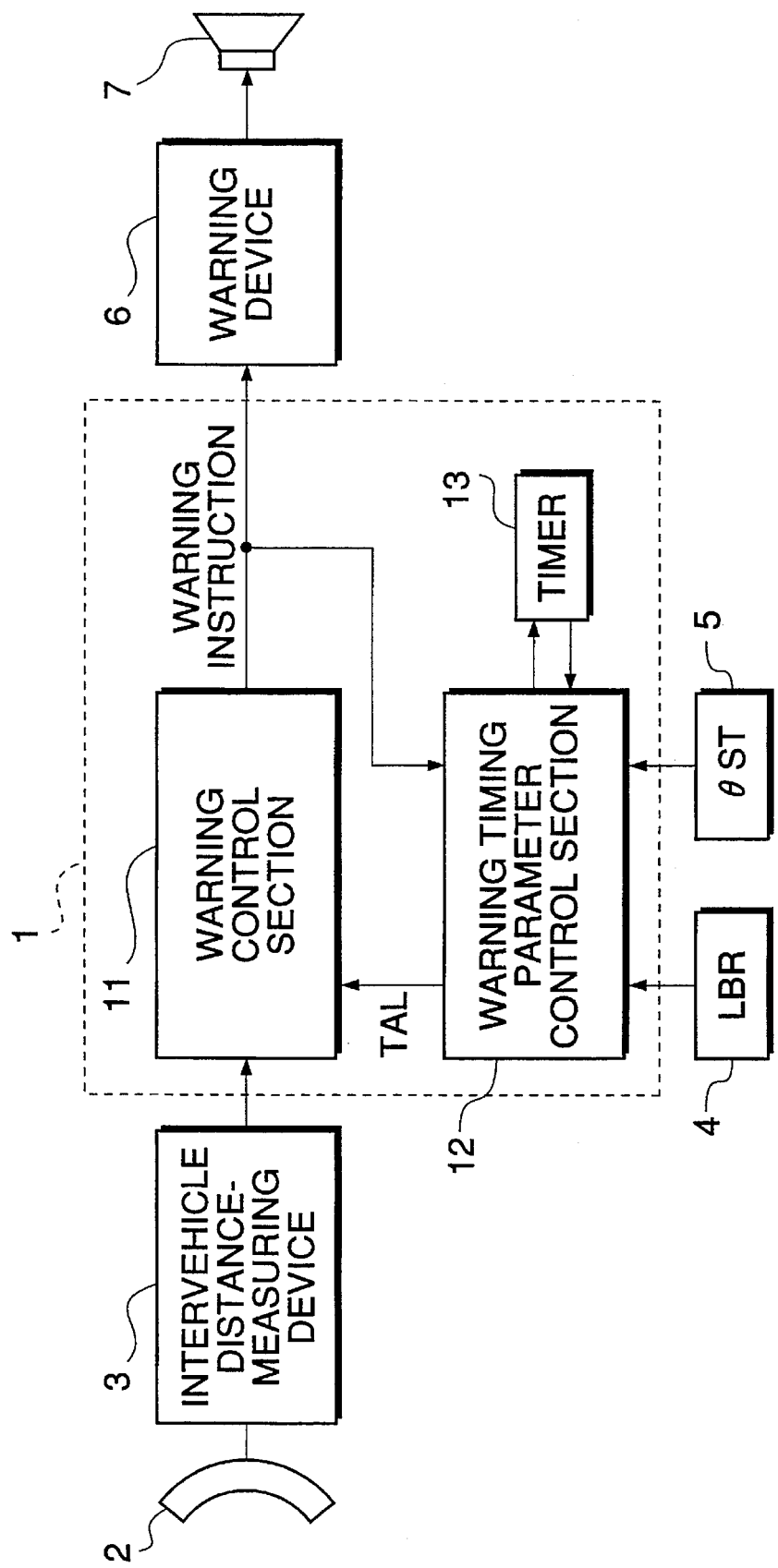
FIG. 1 is a block diagram showing the arrangement of a warning system for an automotive vehicle, according to an embodiment of the invention.

Referring first to FIG. 1, there is illustrated the arrangement of a warning system for an automotive vehicle, according to an embodiment of the invention. In the figure, reference numeral 1 designates a control device which is comprised of a warning control section 11, a warning timing parameter control section 12, and a timer 13. Connected to the warning control section 11 is an intervehicle distance-measuring device 3 with an antenna 2, which measures by radar the distance between a vehicle, not shown, in which the present warning system is installed (referred to hereinafter as "the source vehicle") and a preceding vehicle traveling in advance of the source vehicle. This distance will be referred to hereinafter as "the intervehicle distance DAL". The intervehicle distance-measuring device 3 supplies a signal indicative of the measured intervehicle distance DAL to the warning control section 11. Connected to the warning timing parameter control section 12 are a brake-stepping amount sensor 4 for sensing a stepping amount LBR by which a brake pedal, not shown, of the source vehicle has been stepped on, and a steering-turning angle sensor 5 for sensing a steering-turning angle θST of a steering wheel, not shown, of the source vehicle. These sensors supply respective signals indicative of the sensed values LBR and θST to the warning timing parameter control section 12. Further, a timer 13 is connected to the warning timing parameter control section 12, which in turn interrupts or resets the timer 13 and reads a timer value or measured value therefrom. Further, the warning timing parameter control section 12 calculates the value of a warning timing parameter TAL, referred to hereinafter, and supplies the calculated TAL value to the warning control section 11.

The warning control section 11 operates based on the measured intervehicle distance DAL and the calculated warning timing parameter value TAL to supply a warning instruction signal to a warning device 6 connected to the warning control section 11, when a warning is to be issued. The warning device 6 in turn generates warning sound through a loudspeaker 7, in response to the warning instruction signal.

The warning instruction signal from the warning control section 11 is also supplied to the warning timing parameter control section 12, to be used in calculation of the warning timing parameter TAL as well as as a start trigger for starting the timer 13.

Figure 2:
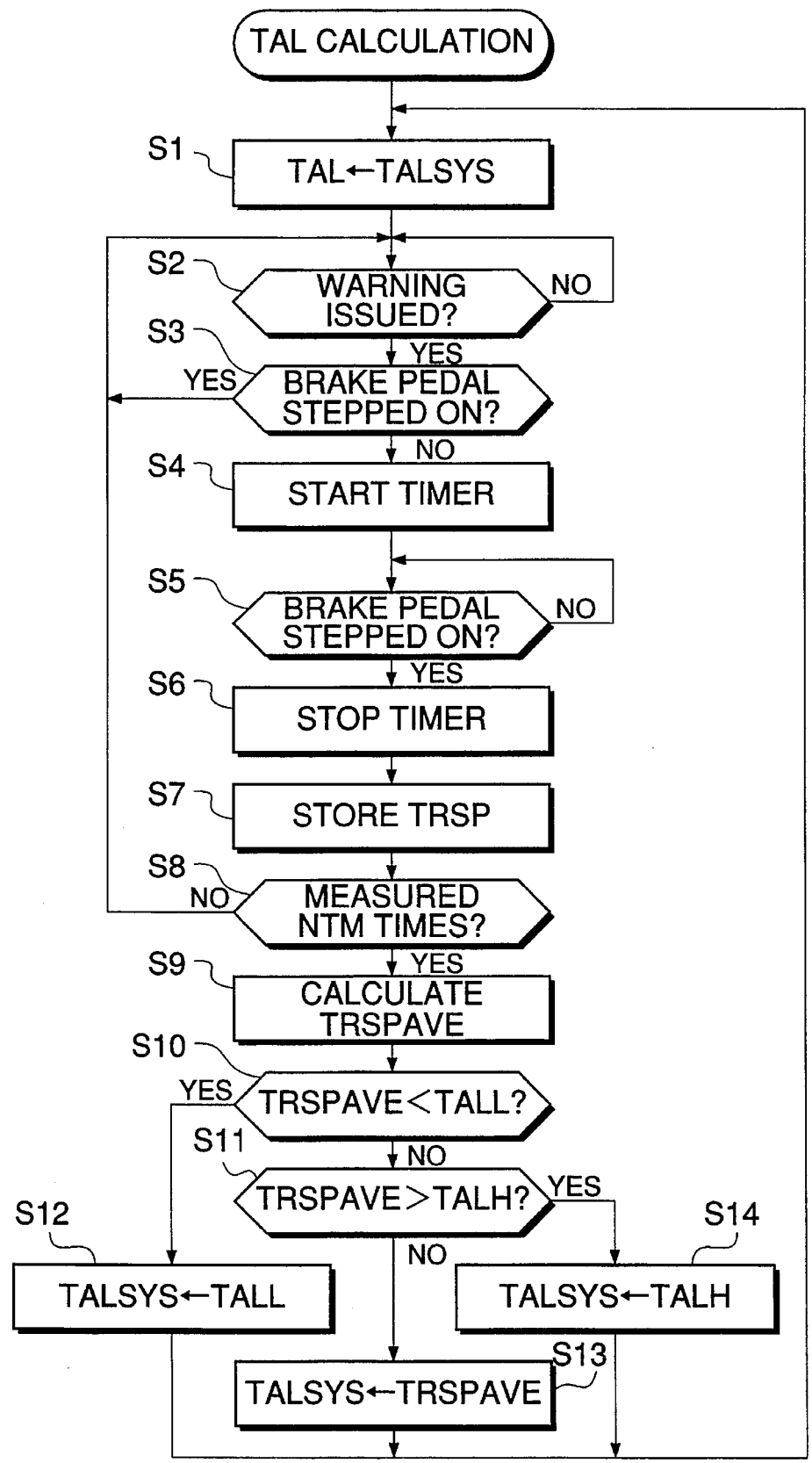
FIG. 2 is a flowchart showing a routine for determining a reaction time, which is executed by a warning timing parameter control section appearing in FIG. 1.

FIG. 2 shows a flowchart of a routine for calculating the warning timing parameter TAL, which is executed by the warning timing parameter control section 12. First, at a step S1, the warning timing parameter TAL value is set to a value TALSYS which is determined by the present warning system in a manner described hereinafter (referred to hereinafter as "the system set value TALSYS"). Then, the program proceeds to a step S2, wherein the program is brought into a standby condition for issue of a warning by the warning device 6. In the first execution of the routine, the system set value TALSYS is set to a predetermined initial value TAL0 (e.g. 1.2 sec.). When a warning is issued, it is determined at a step S3 whether or not the brake pedal is in a stepped-on position. If it is in the stepped-on position, the program returns to the step S2 to wait for issue of a warning.

If the brake pedal is not in the stepped-on position, the timer 13 is started at a step S4, followed by waiting for the brake pedal to be stepped on at a step S5. When the brake pedal has been stepped on, the timer 13 is stopped at a step S6. Then, a measured value TRSP from the timer 13, which indicates a time period (reaction time) from the time the warning is issued to the time the brake pedal is stepped on, is read and stored into a memory at a step S7. It is determined at a step S8 whether or not measurement of the time period, i.e. reading and storing of the measured value TRSP, has been carried out a predetermined number of times NTM. If it has not been carried out the predetermined number of times NTM base on prior warning, the program returns to the step S2 to wait for issue of a warning, whereas if it has been carried out the predetermined number of times NTM, an average value TRSPAVE is calculated from the NTM pieces of data on the timer measured value TRSP, at a step S9.

Then, it is determined at a step S10 whether or not the calculated average value TRSPAVE is smaller than a lower limit value TALL (e.g. 1.0 sec.). If TRSPAVE<TALL holds, the system set value TALSYS is set to the lower limit value TALL at a step S12. If TRSPAVE≧TALL holds, it is further determined at a step S11 whether or not the average value TRSPAVE is larger than an upper limit value (e.g. 1.4 sec.). If TRSPAVE>TALL holds, the system set value TALSYS is set to the upper limit value TALH at a step S14, whereas if TALL≦TRSPAVE≦TALH holds, the system set value TALSYS is set to the average value TRSPAVE at a step S13. The system set value TALSYS thus set is stored into a non-volatile memory for use during the next traveling of the vehicle. It may be so arranged that the system set value TALSYS is set to the initial value TAL0 by depressing a reset button, when another driver has changed with the previous driver, for steering operation.

According to the above described subroutine, the reaction time TRSP, i.e. the time period from the time a warning is issued to the time the driver steps on the brake pedal, is calculated, and if the average value TRSPAVE of the calculated TRSP values falls within the range defined by the upper and lower limit values TALH, TALL, the system set value TALSYS(=TAL) is set to the average value TRSPAVE. By thus setting the value TALSYS to the average value TRSPAVE, the reaction time peculiar to the driver can be accurately determined. The timing of issuing a warning is determined based on the TAL value, whereby a warning is issued at timing corresponding to the driver's reaction time. As a result, any driver can issue a warning at optimal timing when the source vehicle approaches an object such as a preceding vehicle.

Figure 3:
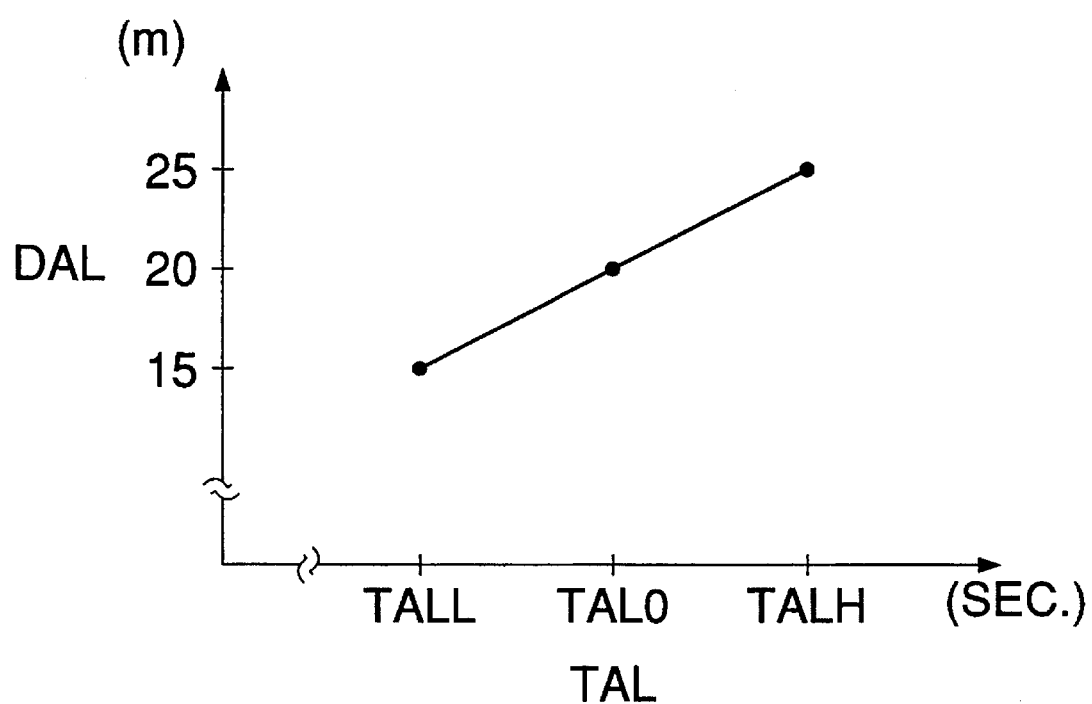
FIG. 3 is a graph showing the relationship between a warning timing parameter TAL and an intervehicle distance DAL for issue of a warning.

The warning issue timing is determined based on the warning timing parameter TAL, according to the relationship shown in FIG. 3. More specifically, if TAL=TAL0 holds, a warning is issued when the intervehicle distance DAL is 20 meters; if TAL=TALL holds, a warning is issued when the distance DAL is 15 meters; and if TAL=TALH holds, a warning is issued when the distance DAL is 25 meters.

Although in the above described embodiment the intervehicle distance is detected for determining the warning issue timing, this is not limitative, but the distance from the source vehicle to another kind of object such as a person and an obstacle may be detected. Besides, to determine the warning issue timing, other factors may be taken into consideration in addition to the intervehicle distance or the like, such as the traveling speed and/or direction of the source vehicle, the traveling or moving speed and/or direction of a neighboring object, and the acceleration or deceleration of the source vehicle and/or the neighboring object.

Further, to calculate the driver's reaction time, the steering operation may also be taken into consideration, together with the braking operation.

The calculation of the reaction time need not be carried out during actual traveling of the vehicle as in the above described embodiment, but alternatively, the reaction time may be calculated when the vehicle is standing, by issuing a quasi warning. Particularly when another person changes with the previous driver for steering operation, this alternative calculation is preferable. In this case, it is desirable to change the system set value TALSYS.

The detection of the intervehicle distance is not limited to detection by a radar as employed in the above described embodiment, but a laser beam may be used to detect the intervehicle distance as disclosed by Japanese Provisional Patent Publication (Kokai) No. 4-213800, for example.

What is claimed is:

1. A warning system for a vehicle, which comprises:

warning issuing means for issuing warnings when said vehicle approaches objects;

driving operation-detecting means for detecting a driving operation by a driver of said vehicle;

reaction time-calculating means for calculating a value of a reaction time from the time one of said warnings is issued by said warning issuing means to the time it is detected by said driving operation-detecting means that said driver starts said driving operation in response to the one of said warnings; and warning control means for controlling timing at which another of said warning should be issued by said warning issuing means, based on the calculated value of said reaction time from prior said warnings.

2. A warning system as claimed in claim 1, wherein said driving operation-detecting means detects a braking operation by said driver.

3. A warning system as claimed in claim 2, wherein said driving operation-detecting means detects a steering operation by said driver.

4. A warning system as claimed in claim 1, wherein said driving operation-detecting means detects a steering operation by said driver.

5. A warning system as claimed in claim 1, wherein said warning control means calculates an average value of values of said reaction time calculated by said reaction time-calculating means, and determines the timing at which another of said warnings should be issued by said warning issuing means, based on the calculated average value.

6. A warning system for a vehicle, which comprises:

warning issuing means for issuing a warning when said vehicle approaches an object;

driving operation-detecting means for detecting a driving operation by a driver of said vehicle;

reaction time-calculating means for calculating a value of a reaction time from the time said warning is issued by said warning issuing means to the time said driving operation-detecting means detects that said driver starts said driving operation in response to said warning;

memory means for storing values of said reaction times; and warning control means for controlling a timing at which said warning is issued by said warning issuing means, said warning control means including means for calculating an average value of reaction time of said driver based on a plurality of previously calculated said values of said reaction time calculated by said reaction time-calculating means, and said warning control means determining the timing at which said warning is issued by said warning issuing means as a predetermined time period before calculating said calculated average value and as based on said calculated average value after calculating said calculated average value.

7. A warning system as claimed in claim 6, wherein said driving operation-detecting means detects a braking operation by said driver.

8. A warning system as claimed in claim 7, wherein said driving operation-detecting means detects a steering operation by said driver.

9. A warning system as claimed in claim 6, wherein said driving operation-detecting means detects a steering operation by said driver.

10. A warning system as claimed in claim 6, wherein said warning control means calculates said average value of said reaction time only after a predetermined number of values of said reaction time calculated by said reaction time-calculating means have been stored in said memory means.

11. A warning system as claimed in claim 10, wherein said warning control means determines said timing at which said warning is issued as a preselected minimum time period when said calculated average value is below said preselected minimum time period.

12. A warning system as claimed in claim 10, wherein said warning control means determines said timing at which said warning is issued as a preselected maximum time period when said calculated average value is above said preselected maximum time period.

13. A warning system as claimed in claim 12, wherein said warning control means determines said timing at which said warning is issued as a preselected maximum time period when said calculated average value is above said preselected maximum time period.

14. A warning system as claimed in claim 13, wherein said driving operation-detecting means detects a braking operation by said driver.

15. A warning system as claimed in claim 6, wherein said warning control means determines said timing at which said warning is issued as a preselected minimum time period when said calculated average value is below said preselected minimum time period.

16. A warning system as claimed in claim 15, wherein said warning control means determines said timing at which said warning is issued as a preselected maximum time period when said calculated average value is above said preselected maximum time period.

17. A warning system as claimed in claim 6, wherein said warning control means determines said timing at which said warning is issued as a preselected maximum time period when said calculated average value is above said preselected maximum time period.

* * * * *